(12) United States Patent
Takeuchi et al.

(10) Patent No.: US 7,056,062 B2
(45) Date of Patent: Jun. 6, 2006

(54) SUBTERRANEAN WASTE DISPOSAL PROCESS AND SYSTEM

(76) Inventors: Richard T. Takeuchi, 3518 Harding Ave., Honolulu, HI (US) 96816-2413; Robert M. Nakamura, 98-531 Maki, Aiea, HI (US) 96701

(*) Notice: Subject to any disclaimer, the term of this patent is extended or adjusted under 35 U.S.C. 154(b) by 165 days.

(21) Appl. No.: 10/617,861

(22) Filed: Jul. 14, 2003

(65) Prior Publication Data

US 2005/0022416 A1 Feb. 3, 2005

(51) Int. Cl.
*B09B 1/00* (2006.01)
(52) U.S. Cl. .............................. 405/129.38; 405/129.2; 405/129.5
(58) Field of Classification Search .......... 405/129.35, 405/129.5, 53, 54, 55
See application file for complete search history.

(56) References Cited

U.S. PATENT DOCUMENTS

| 2,504,462 | A | * | 4/1950 | Sprague et al. ............. 166/187 |
| 3,236,053 | A | * | 2/1966 | Billue .................. 405/129.35 |
| 3,724,542 | A | * | 4/1973 | Hamilton .................... 166/246 |
| 4,273,615 | A | * | 6/1981 | Hirbod ........................ 376/275 |
| 4,320,028 | A |   | 3/1982 | Leuchtag |
| 4,417,829 | A | * | 11/1983 | Berezoutzky ................ 405/54 |
| 4,474,053 | A | * | 10/1984 | Butler .......................... 405/54 |
| 4,842,774 | A |   | 6/1989 | Golden |
| 4,845,034 | A | * | 7/1989 | Menger et al. ............. 435/167 |
| 4,894,928 | A |   | 1/1990 | Bishop |
| 4,906,135 | A | * | 3/1990 | Brassow et al. ........ 405/129.35 |
| 5,000,617 | A | * | 3/1991 | Eggert et al. .......... 405/129.35 |
| 5,109,933 | A | * | 5/1992 | Jackson ................. 405/129.35 |
| 5,202,522 | A | * | 4/1993 | Williams .................... 588/250 |
| 5,387,737 | A | * | 2/1995 | Schmidt et al. ........ 405/129.35 |
| 5,413,432 | A | * | 5/1995 | Cummings ............... 405/129.2 |
| 5,433,553 | A | * | 7/1995 | Pearson et al. ........ 405/129.35 |
| 6,056,477 | A |   | 5/2000 | Ueda et al. |

OTHER PUBLICATIONS

Tver, David F.: The Petroleum Dictionary. 1980 p. 369.*

* cited by examiner

*Primary Examiner*—John Kreck
(74) *Attorney, Agent, or Firm*—Siemens Patent Services, LC

(57) ABSTRACT

A method for using large chambers, located deep within the earth, for the disposal of processed waste is disclosed. In this context, waste includes solid waste from sewage, and other organic-waste materials from urban, agricultural or industrial sources. These wastes will be processed by mechanical pulverization and hydration to produce a slurry, which will be injected into the well's chamber. The anaerobic condition in the chamber will be conducive to the production of gases, especially methane which will be harvested as a source of industrial fuel. Hydrogen, ammonia and other gases will also be harvested. This system will alleviate the acute problem of disposal of wastes from urban agricultural and industrial sources. It will decrease pollution of the air with greenhouse gases and pollution of the land area water with organic wastes and also release of disease-causing pathogens. The system may be adapted to facilitate the disposal of nuclear wastes.

8 Claims, 1 Drawing Sheet

SUBTERRANEAN WASTE DISPOSAL PROCESS AND SYSTEM

FIELD OF THE INVENTION

The present invention relates to a process for waste storage and, more particularly, to a waste receiving, processing and storage system using earthen chambers.

BACKGROUND OF THE INVENTION

There is worldwide concern for the increasing problems of waste disposal and pollution of the environment by waste produced by humans. The Deep Biosphere, by Thomas Gold (Copernicus Books, New York), describes the earth's deep biosphere and the unusual *archaebacteria* that are halophilic, thermophilic, and methanogenic microbes that are available.

Consideration of the problem and the description of oil well's and *Archaebacteria*, suggested the possibility of the disposal of wastes in spent oil wells. This method would solve the problem of waste disposal, control the release of gaseous elements emanating from present day landfills that pollute the environment, and allow the harvesting useful methane produced by waste disposed of in spent oil well's.

The present technology for solid wastes is to deposit trash into landfills that may be covered over with soil and green plants when full. The separation of waste water (sewage) solid components will be sent to the landfills and the liquid components piped into bodies of water (ocean, lakes, and rivers). Trash may be also be burned and sometimes converted to electricity. In rural areas, sewage waste has been used as soil complement or used in methane producing systems (mostly animal waste) usually used directly for home use (usually in 3rd world countries) or used as a source on large farms.

The major problem of landfills may be the lack of land, especially in urban settings. The sad stories of trash from East Coast (USA) and from Taiwan cities loaded on barges in search of dump sites, emphasize the enormity of the problem. The offensive odors generated and the proliferation of vermin, birds, dogs, and other organisms attracted to trash sites are undesirable. The production of methane, $CO_2$ and other gases is a serious source of environmental pollution. The large area covered by the landfills precludes the capping of the landfill to harvest the methane and other gases for productive uses. Waste disposed in bodies of water is a serious source of chemical and microbial contamination.

DISCUSSION OF THE PRIOR ART

The prior art is replete with systems used for waste disposal.

The U.S. Pat. No. 6,056,477, to Ueda, et al., for a Waste Disposal Site teaches of a site equipped with a water-impermeable material damage-detecting system which is capable of detecting damages to liner or water-impermeable materials used at a site.

The U.S. patent to Golden (U.S. Pat. No. 4,842,774) is for a Pyramiding Tumuli Waste Disposal Site and Method of Construction Thereof. This patent teaches of an above ground disposal of waste using at least three tumuli. The tumuli each have specific structure of sloping sides and shield walls for protecting workers from potentially harmful radiation.

The U.S. patent to Bishop (U.S. Pat. No. 4,894,928) discloses subterranean grain storage having gas impermeable walls used to store grains. Although subterranean storage is taught, there is no mention of waste processing as in the instant invention.

The U.S. patent to Leuchtag (U.S. Pat. No. 4,320,028) discloses a nuclear waste disposal system. The nuclear waste is mixed with glass composites and formed into a cable which is subsequently wound onto a support below the earth's surface for extended storage.

None of these patents either teaches or suggests the usage or pre-existing earthen chamber, such as a spent oil well, and provides a waste processing plant in conjunction with treatment, monitoring and extraction plants in communication therewith.

SUMMARY OF THE INVENTION

The present invention relates to the concept of using large, deep, empty chambers with small openings, located deep within the earths subterranean zone, preferably spent oil wells, for the disposal of processed organic waste. Waste in this context includes solid waste from sewage, and other organic-waste materials from urban, agricultural or industrial sources. These wastes will be processed by mechanical pulverization and hydration to produce a slurry, which will be injected into the well's chamber. The anaerobic condition in the chamber will be conducive for the production of gases, especially methane, which will be harvested as a source of industrial fuel. Hydrogen, ammonia and other gases will also be harvested. This system will alleviate the acute problem of disposal of wastes from urban, agricultural and industrial sources. It will decrease pollution of the air with greenhouse gases and pollution of the land area water with organic wastes and also release of disease-causing pathogens.

There are also great problems related to the safe disposal of all forms of nuclear waste generated from many sources, including medical, industrial, research, power generation, military, etc. Nuclear waste presents a major problem for the Department of Energy. This type of waste cannot be buried in landfills, diluted in bodies of water, detoxified, or incinerated.

The dual features of the present invention can be readily adapted to accommodate, for safe keeping, all forms of nuclear waste and other environmentally hazardous materials, e.g. asbestos laden materials. Nuclear waste in these categories will be subjected to specialized processing of reduction, using laser, chemical and mechanical methods, producing a liquified product with the consistency of slurry. The liquifiers can be any acceptable fluids, preferably crude oil. The slurry will be injected into the very deep, spent oil wills, utilizing its existing infrastructure of valves and crude recovery pipes. Due to the dangerous nature of the nuclear wastes, the wells should be located in a sparsely populated area, away from faults and volcanoes, and having well depths exceeding 3.5 kilometers, to avoid accidents where the nuclear slurry may be subjected to geophysical forces. The economical advantage of the present invention would be cheaper and safer than the Yucca Mountain Nuclear Waste Depository now in developement.

It is therefore an object of the invention to provide a process for using spent oil wells for productive waste disposal.

It is another object of the invention to provide a series of conduits and processing plants above ground for communication with earthen chambers.

It is also an object of the invention to provide a utilization of spent oil well chambers as a device to deposit the contaminated waste products and byproducts, preventing the release of hazardous pollutants into the environment.

It is a further object of the invention to use commercially available products, equipment, chemical formulas and pre-existing, unused earthen chambers for transforming into useful processes of materials recycling.

It is also an object to provide a utilization of spent oil well chambers as a device to deposit the contaminated waste products and byproducts related to nuclear wastes whose depth exceed 3.5 kilometers.

It is also an object of the invention to provide a process for using spent oil wells for productive waste disposal that provides the production and extraction of hydrogen, methane, ammonia and other utilizable gasses that will provide a viable energy source for cities, farms and industries.

These and other objects, features and advantages will be more apparent from a study of the enclosed text and the appended drawing.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

Figure 1:
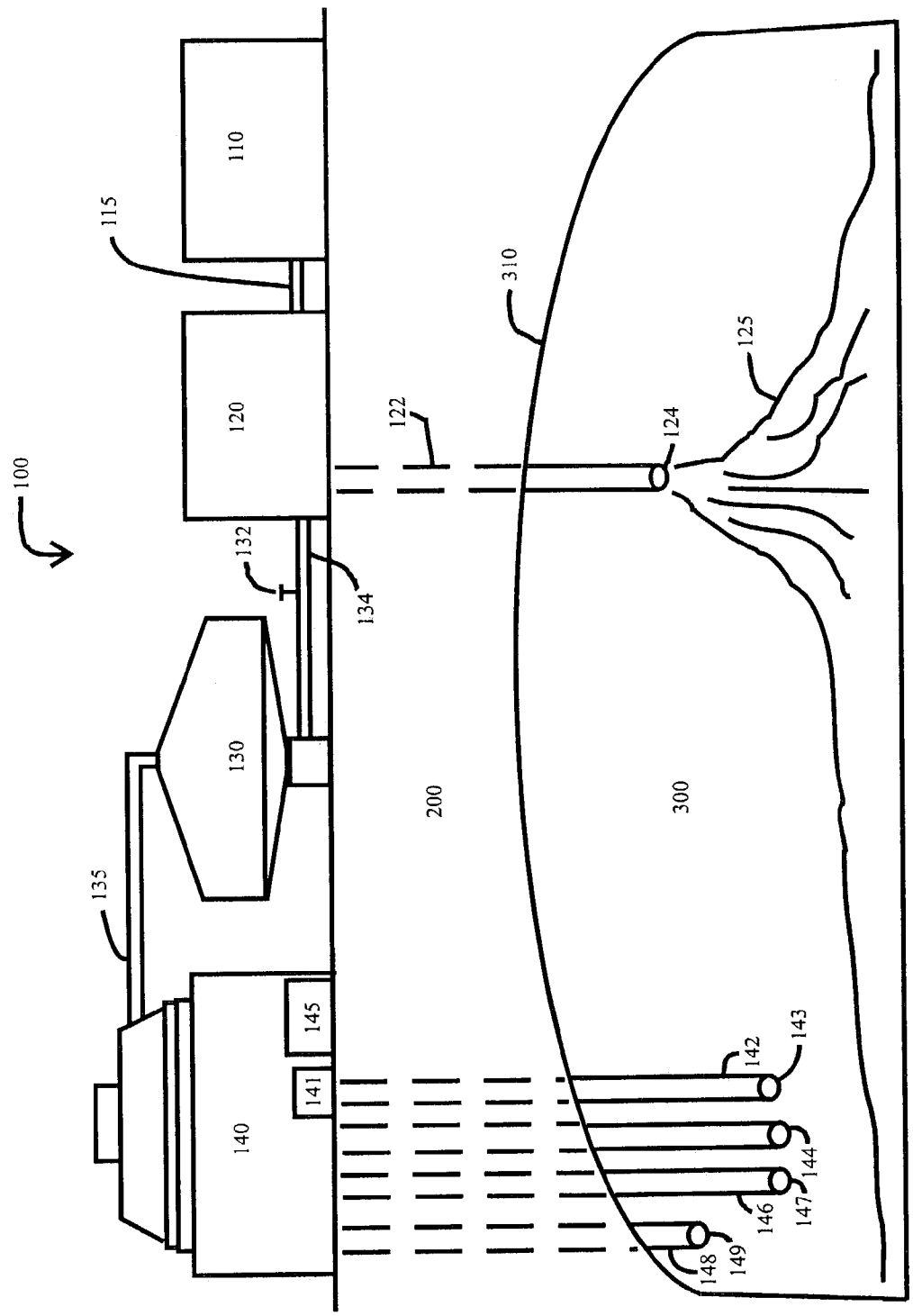
FIG. 1 is a schematic an elevation view of the components of the subterranean waste disposal system, in accordance of the present invention.

This disclosure of the invention is submitted in furtherance of the constitutional purposes of the U.S. Patent Laws "to promote the progress of science and useful arts" (Article 1, Section 8).

A waste disposal site is generally formed by digging the ground to a certain appropriate depth, and depositing waste substances therein. However, the instant invention is an improvement, in that pre-existing earthen chambers are used for the storage and processing of organic waste.

As shown in FIG. 1, the process and System for waste receiving, processing and storage employs the use of a waste receiving and processing plant 100 (WRPP) and an earthen chamber 300 embedded below the earth's subsurface 200. The WRPP 100 is operatively connected to associated machinery 110, 120, 130 and 140. The series of machinery 110–140 are each equipped with pipes or conduits connecting to one another and/or to a location within the earthen chamber 300.

A waste receiving and mechanically processing plant (WRMPP) 110 receives organic waste, mechanically pulverizes the waste, producing a product with the consistency of slurry. In WRMPP 110, fermenters and/or suspensors may also be added to the slurry. WRMPP 110 is connected to a pumping plant 120 via conduit 115. Pipe 122 is an inlet conduit having port 124 for pumping treated slurry 125 into a suitable earthen chamber 300. The pumping plant 120 is also where motorized pumps, compressors, automated equipment and related supplies necessary for the waste processing are housed.

The preferred earthen chamber 300 is a pre-existing, spent oil well. The spent oil well is key to the novelty of this inventive process and storage system. For the purposes of this invention, 'spent oil well' is defined as a large, sealed, empty chamber having a boundary structure 310, and is formed by extraction of millions of barrels of crude oil. Large volumes of waste disposed in this chamber and subjected to the pressures and biota (e.g. methaneogenic bacteria) will produce methane gas, ammonia, hydrogen and other gases. Gases, particularly methane, and possibly ammonia and hydrogen, may be harvested as useful source of energy or other uses.

Some alternatives to the use of spent oil wells may be salt domes, abandoned mines (e.g. coal mines) lava tubes and other large and deep natural or artificial chambers. All these alternatives have the characteristic of containing large volumes of waste so that the gases that are produced can be harvested for use and will not contaminate the environment.

As further seen in FIG. 1, a redox tank 130 receives and stores slurry therein, the tank being a place where oxidation-reduction reactions of the slurry takes place. Pumping plant 120 transfers this slurry by way of conduits 134 which may contain valves 132 for controlling the rate, degree and amount of transfer. A vacuum pipe 135 connects redox tank 130 to a building 140 housing related maintenance and equipment.

This building 140 houses related equipment such as a methane burning electricity generating system 145. Additionally, a series of pipes 148, 146, 144 and 142 connecting chamber 300 to the building 140 for monitoring the treated slurry 125 and any produced gases. Specimen collection pipe 146 collects solid slurry specimen via specimen collection port 147. Electronic monitoring piping 144 monitors the slurry production development. This may be done by well known procedures such as electro-spectroscopy and the like.

Chamber extraction conduit 142 extracts gaseous products at different levels within the chamber 300, for monitoring. The chamber extraction conduit 142 has an associated pipe movement means 141 for vertically displacing conduit 142 to different heights within the chamber 300. Pipe movement means 141 may comprise electromechanical motors with necessary circuitry and gears for the displacement of chamber extraction conduit 142. Ventilation conduit 148 provides the appropriate ventilation of any non-usable biogases produced within the chamber via ventilation port 149.

The invention has been illustrated and described as the embodiment in the use of subterranean chambers as a device to deposit processed organic-wastes. The processes and procedures associated with the transformation of organic waste into useful products and other related advantages are the core of the invention.

The system of the present invention may be adapted for the depositing of nuclear and other bio-hazardous wastes, such as asbestos laden materials by the introduction of liquifiers, such as crude oil, to transform the mechanically reduced waste into a slurry form which can be more easily deposited into the subterranean chamber. The storage of bio-hazardous wastes would, of course, require additional safety and monitoring systems to ensure public safety, the specifics of the additional monitoring systems not being an integral of the present invention, however.

The present invention is not intended to be limited to the details shown, since it will be understood that various omissions, modifications, substitutions and changes in the forms and details of the designs illustrated and its operating service can be made by those skilled in the arts without departing in anyway from the spirit of the present invention.

Having thus described the invention, what is desired to be protected by Letters Patent is presented in the subsequent appended claims.

What is claimed is:

1. A process for subterranean waste disposal and processing within a spent oil well, said process comprising the steps of:
   1) providing a sealed, empty, subterranean, spent oil well containing halophilic, thermophilic, and methanogenic microbes therein;
   2) providing a waste receiving and processing system, said waste receiving and processing system comprising a series of buildings and plants in operative communication with one another and a series of pipes operatively connecting said buildings and plants of the waste receiving and processing system to said subterranean spent oil well,
   said waste receiving and processing system having:
   a) a waste receiving and mechanical processing plant,
   b) a pumping plant, and
   c) a redox tank, and
   d) an equipment housing building,
   3) receiving and mechanically pulverizing waste and treating said waste such that it is transformed into slurry;
   4) disposing of said slurry in said spent oil well; and
   5) subjecting said slurry to said microbes to produce gases.

2. The process for subterranean waste disposal and processing within a spent oil well of claim 1, further comprising the steps of providing said pumping plant with an inlet conduit coupling said pumping plant to said spent oil well and pumping said treated slurry into said spent oil well.

3. The process for subterranean waste disposal and processing within a spent oil well of claim 2, further comprising the steps of delivering slurry from said pumping plant to said redox tank and storing said treated slurry in said redox tank.

4. The process for subterranean waste disposal and processing within a spent oil well of claim 3, further comprising the step of providing said equipment housing building with:
   a) a ventilation conduit,
   b) a specimen collection conduit,
   c) an electronic monitoring pipe,
   d) a displacable chamber extraction conduit, said chamber extraction conduit having displacement means connected thereto for vertical displacement of said chamber extraction conduit thereby enabling gaseous samples to be obtained from different levels within said spent oil well, and
   e) a gas-burning electricity generating subsystem.

5. The process for subterranean waste disposal and processing within a spent oil well, as in claim 4, further comprising the step of obtaining specimens of said treated slurry via said specimen collection conduit.

6. The process for subterranean waste disposal and processing within a spent oil well as in claim 5, further comprising the step of electronically monitoring waste products within said spent oil well with said electronic monitoring pipe.

7. The process for subterranean waste disposal and processing within a spent oil well of claim 6, further comprising the step of vertically displacing said chamber extracting conduit and obtaining gaseous samples at different levels within said spent oil well.

8. The process for subterranean waste disposal and processing within a spent oil well as in claim 7, wherein further comprising the step of burning methane gas harvested from said spent oil well for the production of electricity via said gas-burning electricity generating subsystem.

* * * * *